United States Patent
Choi

(10) Patent No.: US 11,644,135 B2
(45) Date of Patent: May 9, 2023

(54) CONNECTING DEVICE FOR CORRUGATED PIPE AND COUPLING METHOD THEREOF

(71) Applicant: DONG-A FLEXIBLE METAL TUBES CO., LTD., Yongin-si (KR)

(72) Inventor: Jinlim Choi, Yongin-si (KR)

(73) Assignee: DONG-A FLEXIBLE METAL TUBES CO., LTD., Yongin-si (KR)

( * ) Notice: Subject to any disclaimer, the term of this patent is extended or adjusted under 35 U.S.C. 154(b) by 0 days.

(21) Appl. No.: 17/684,900

(22) Filed: Mar. 2, 2022

(65) Prior Publication Data

US 2022/0186863 A1 Jun. 16, 2022

Related U.S. Application Data

(63) Continuation of application No. 16/169,722, filed on Oct. 24, 2018, now Pat. No. 11,306,850.

(30) Foreign Application Priority Data

| Oct. 24, 2017 | (KR) | 10-2017-0138444 |
| Sep. 6, 2018 | (KR) | 10-2018-0106375 |
| Oct. 17, 2018 | (KR) | 10-2018-0123742 |

(51) Int. Cl.
  *F16L 25/00* (2006.01)
  *F16L 33/32* (2006.01)
  (Continued)

(52) U.S. Cl.
  CPC ........... *F16L 25/0036* (2013.01); *F16L 11/15* (2013.01); *F16L 19/0206* (2013.01);
  (Continued)

(58) Field of Classification Search
  CPC ... F16L 25/0036; F16L 19/0206; F16L 11/15; F16L 19/065; F16L 33/26; F16L 33/32;
  (Continued)

(56) References Cited

U.S. PATENT DOCUMENTS

| 5,908,211 A | 6/1999 | Blackwell et al. |
| 9,528,640 B2 | 12/2016 | Yoon |
| 9,562,635 B2 | 2/2017 | Williams et al. |
| 2002/0079702 A1 | 6/2002 | Baumann et al. |
| 2002/0145284 A1 | 10/2002 | Powell |

(Continued)

FOREIGN PATENT DOCUMENTS

| CN | 104813088 A | 7/2015 |
| CN | 205781522 U | 12/2016 |

(Continued)

*Primary Examiner* — Matthew Troutman
*Assistant Examiner* — William S. Choi
(74) *Attorney, Agent, or Firm* — Birch, Stewart, Kolasch & Birch, LLP

(57) ABSTRACT

Provided is a corrugated pipe connection device. The device includes a corrugated pipe including a groove and a ridge that are successively and alternately formed, a nut into which one side portion of the corrugated pipe is inserted, wherein the nut has a screw-thread on an inner circumferential surface thereof, a clamping ring being formed in a ring shape cut at one place thereof and including an inner portion formed convexly in a radially inward direction of the corrugated pipe to be inserted into the groove of the corrugated pipe and an outer portion protruded in a radially outward direction from the inner portion, wherein the outer portion comprises an outer circumferential surface, and a socket having a screw-thread on an outer circumferential surface thereon onto which the nut is screwed.

13 Claims, 14 Drawing Sheets

(51) Int. Cl.
*F16L 11/15* (2006.01)
*F16L 19/065* (2006.01)
*F16L 19/02* (2006.01)
*F16L 33/26* (2006.01)

(52) U.S. Cl.
CPC ............ *F16L 19/065* (2013.01); *F16L 33/26* (2013.01); *F16L 33/32* (2013.01); *F16L 2201/10* (2013.01)

(58) Field of Classification Search
CPC ............... F16L 2201/10; F16L 19/0212; F16L 19/0286; F16L 25/0054; F16L 27/0857; F16L 9/06; F16L 11/11; F16L 25/0063; F16L 51/02; F16L 2201/60
USPC ...... 285/256, 80, 226, 227, 299, 145.5, 903, 285/151.1
See application file for complete search history.

(56) References Cited

U.S. PATENT DOCUMENTS

| | | |
|---|---|---|
| 2010/0117358 A1 | 5/2010 | Treichel et al. |
| 2010/0209178 A1 | 8/2010 | Oh |
| 2012/0256412 A1 | 10/2012 | Oh |
| 2013/0049359 A1 | 2/2013 | Choi |
| 2015/0276102 A1 | 10/2015 | Yoon |

FOREIGN PATENT DOCUMENTS

| | | |
|---|---|---|
| EP | 2083203 A1 | 7/2009 |
| EP | 2397739 A1 | 12/2011 |
| EP | 3015752 A1 | 5/2016 |
| JP | 62-119591 U | 7/1987 |
| JP | 2002-139185 A | 5/2002 |
| JP | 2006-170379 A | 6/2006 |
| JP | 2011-202767 A | 10/2011 |
| KR | 20-1996-0018171 U | 6/1996 |
| KR | 20-2001-0000927 U | 1/2001 |

US 11,644,135 B2

CONNECTING DEVICE FOR CORRUGATED PIPE AND COUPLING METHOD THEREOF

CROSS REFERENCE TO RELATED APPLICATIONS

This application is a Continuation of U.S. application Ser. No. 16/169,722 filed on Oct. 24, 2018, which claims the priority benefit under 35 U.S.C. 119(a) to Korean Patent Application No. 10-2017-0138444, filed in the Republic of Korea on Oct. 24, 2017, Patent Application No. 10-2018-0106375, filed in the Republic of Korea on Sep. 6, 2018, and Patent Application No. 10-2018-0123742, filed in the Republic of Korea on Oct. 17, 2018, all of which are hereby expressly incorporated by reference into the present application.

BACKGROUND OF THE INVENTION

Field of the Invention

The present invention relates to a corrugated pipe connection device and a coupling method thereof, and more particularly to a corrugated pipe connection device in which a socket and a nut are coupled to one end of a corrugated pipe to enable connection of the corrugated pipe to a fluid movement unit, an opening/closing valve, or the like, and a coupling method thereof.

Description of the Related Art

A connection device for a corrugated pipe according to the related art is disclosed in No. KR 2014-0025124. The disclosed corrugated pipe connection device, as illustrated in FIGS. 1 to 3, includes a corrugated pipe 1, a nut 2 inserted around the corrugated pipe 1 so as to surround the outer circumferential surface of a one-side portion of the corrugated pipe, a clamping ring 3 having an inner portion inserted into a groove formed in one end portion of the corrugated pipe 1 to stop movement of the nut 2 in a given direction, and a socket 4 configured to press a distal end 5 of the corrugated pipe 1 towards the clamping ring 3 while being screwed to the nut 2.

As illustrated in FIG. 2, the clamping ring 3 takes the form of a ring that is cut at one side thereof so that both ends 6 and 7 thereof are spaced apart from each other by a predetermined distance D. When the clamping ring 3 is pressed in the radial center direction, the distance D is reduced and the inner diameter of the clamping ring 3 is reduced. Conversely, when the two respective ends 6 and 7 of the clamping ring 3 are pulled outwards, the distance D is increased and the inner diameter of the clamping ring 3 is increased.

Explaining a coupling method of the corrugated pipe connection device described above, after the nut 2 and the clamping ring 3 are sequentially inserted around the outer circumferential surface of the one-side portion of the corrugated pipe 1, the clamping ring 3 is tightened so that the inner portion of the clamping ring 3 is inserted into the groove of the corrugated pipe 1.

Next, after the nut 2, inserted around the corrugated pipe 1, is moved towards the clamping ring 3, as illustrated in FIG. 3A, the nut 2 is tightened so that the socket 4 is screwed to the nut 2. Thereby, as illustrated in FIG. 3B, the corrugated pipe 1 and the clamping ring 3 are moved towards the socket 4, so that a tip end 8 of the socket 4 pushes the clamping ring 3 into a seat portion 9 while pressing the distal end 5 of the corrugated pipe 1 and the distal end 5 of the corrugated pipe 1 is further pressed between the clamping ring 3 and the socket 4 so as to seal the gap between the clamping ring 3 and the socket 4.

In the above-described corrugated pipe connection device according to the related art, however, since the clamping ring 3 is coupled to the corrugated pipe 1 so that the inner portion of the clamping ring 3 is inserted into the groove formed in the one-side portion of the corrugated pipe 1 before the nut 2 and the socket 4 are screwed to each other, the inner diameter of the clamping ring 3 is typically much smaller than the outer diameter of the corrugated pipe 1. This requires a worker to perform a difficult operation of pulling the respective ends 6 and 7 of the clamping ring 3, which is formed of a highly rigid metal material outwards, so as to increase the inner diameter of the clamping ring 3 and then inserting the clamping ring 3 into the groove of the corrugated pipe 1.

Moreover, since the clamping ring 3 exceeds the elastic limit thereof when external force is applied to excessively increase the inner diameter of the clamping ring 3, the clamping ring 3 does not return to the original shape thereof even when the external force is removed, and thus fails to achieve a seal.

In addition, when the clamping ring 3 is distorted a little in the coupling process thereof, the clamping ring 3 is brought into eccentric contact with the corrugated pipe 1, which degrades sealing efficiency.

In order to solve these problems, although it is conceivable to manufacture and use the clamping ring 3 having a large inner diameter, in the process of tightening the clamping ring 3 radially inwards while maintaining the completely circular shape of the clamping ring 3 so as to bring the clamping ring 3 into close contact with the groove formed in one end portion of the corrugated pipe 1, the clamping ring 3 and the corrugated pipe 1 generate an inappropriate coupling region therebetween in which they are not in close contact with each other, or the clamping ring 3 is deformed when the nut 2 is tightened with excessive force. Thus, since the clamping ring 3 is separated from the corrugated pipe 1, or since the nut 2, the clamping ring 3, the socket 4, and the corrugated pipe 1 are eccentrically coupled to each other, rather than being accurately coupled to each other at predetermined positions, a sealing error occurs.

Furthermore, the clamping ring 3 is often lost during the coupling of the corrugated pipe connection device by the worker.

In addition, the corrugated pipe connection device according to the related art causes fluid leakage due to the possibility of the gap between the outer circumferential surface of the clamping ring 3 and the seat portion 9 of the nut 2 or the gap between the groove of the corrugated pipe 1 and the clamping ring 3.

In addition, since the distal end 5 of the corrugated pipe 1 is pressed by coming into surface contact with the tip end 8 of the socket 4, the area of the press surface for sealing is increased, and larger tightening force is required for the pressing operation.

In addition, since pressing force from the socket 4 having a predetermined magnitude is dispersed throughout the distal end 5 of the corrugated pipe 1, which is in surface contact with the distal end 8 of the socket 4, local gaps are generated between the clamping ring 3, an end surface 5b of the corrugated pipe 1, and the socket 4, which causes fluid leakage.

SUMMARY OF THE INVENTION

Therefore, the present invention has been made in view of the above problems, and it is an object of the present invention to provide a corrugated pipe connection device and a coupling method thereof, in which a sealing element, such as a clamping ring or a packing, is disposed inside the corrugated pipe connection device and is temporarily coupled to a nut so that the coupling of the corrugated pipe connection device is completed simply by inserting a corrugated pipe and then tightening the nut. In particular, the object is to enable the simplified coupling of the corrugated pipe connection device by omitting a process of directly coupling the clamping ring to the corrugated pipe by the worker.

It is another object of the present invention to provide a corrugated pipe connection device and a coupling method thereof, in which constituent elements, such as a socket, a clamping ring, a packing, and a nut, are automatically and appropriately coupled to each other via close contact therebetween so as to achieve excellent sealing.

It is another object of the present invention to prevent a clamping ring from being eccentrically coupled to a corrugated pipe during the coupling of a corrugated pipe connection device, or to prevent deformation, separation, or lost of a sealing element from the corrugated pipe connection device.

It is another object of the present invention to maintain the original shape of a sealing region without deformation and consequently to prevent fluid leakage even if a strong external impact is applied to a corrugated pipe connection device or even if the position of a corrugated pipe is changed upwards, downwards, leftwards, or rightwards at the time of completion of a corrugated pipe connection operation or during the use of the corrugated pipe connection device.

It is a further object of the present invention to provide a corrugated pipe connection device which is capable of preventing fluid leakage via a simplified repair operation of further tightening only a nut without dismantling or replacing constituent elements of the corrugated pipe connection device when fluid leakage occurs during the use of the corrugated pipe connection device installed on site.

In accordance with an aspect of the present invention, the above and other objects can be accomplished by the provision of a corrugated pipe connection device including a corrugated pipe, a nut into which a one-side portion of the corrugated pipe is inserted, a clamping ring including an inner portion configured to be inserted into a groove formed in the one-side portion of the corrugated pipe, and a socket screwed to the nut, wherein the socket is formed on a front surface thereof with an outer protrusion that protrudes in a longitudinal direction of the socket, wherein one side surface of the clamping ring is brought into contact with a tip end of the outer protrusion when the nut and the socket are primarily screwed to each other, and wherein, when the nut and the socket are secondarily screwed to each other, the outer protrusion is inserted into a gap between an inner circumferential surface of the nut and an outer circumferential surface of the clamping ring, the clamping ring is pressed radially inwards so that the inner portion of the clamping ring is inserted into the groove of the corrugated pipe, and a distal end of the corrugated pipe is pressed between the front surface of the socket and the clamping ring.

The inner circumferential surface of the nut may be formed with a first seat portion on which the clamping ring is seated when the nut and the socket are secondarily screwed to each other.

The inner circumferential surface of the nut may be formed with a slope between a region thereof to be screwed to the socket and the first seat portion so as to press the clamping ring radially inwards.

The front surface of the socket may be formed with an inner protrusion so that the inner protrusion is spaced radially inwards apart from the outer protrusion, and a groove is formed between the inner protrusion and the outer protrusion.

The inner protrusion may be formed so as to face the side surface of the clamping ring for pressing the distal end of the corrugated pipe towards the clamping ring.

The clamping ring may include a rectangular outer portion including the side surface and an outer circumferential surface of the clamping ring and an inner portion formed at a radial inner side of the outer portion and including a center portion formed as a curved portion so as to be convex inwards, and the inner protrusion may be formed so as to face the inner portion and to bring into contact with the curved portion of the clamping ring.

The inner protrusion may include an angled upper edge, and the edge may press the distal end of the corrugated pipe in linear contact with the distal end of the corrugated pipe.

The inner circumferential surface of the nut may be formed at one side of the first seat portion with a stepped portion that protrudes radially inwards so as to press the clamping ring towards the socket, the slope may be composed of first and second slopes that are longitudinally spaced apart from each other towards the first seat portion, and a second seat portion on which the outer protrusion is seated may be formed between the first and second slopes.

The groove may be formed such that a packing member is inserted thereinto, and the side surface of the clamping ring and the distal end of the corrugated pipe may come into contact with the packing member.

The socket includes a fastening portion configured to be screwed to the nut and an exposed portion extending from the fastening portion in a direction opposite the clamping ring so as to be exposed to an outside, and an inner circumferential surface of the exposed portion is recessed radially further outwards than an inner circumferential surface of the fastening portion.

In accordance with another aspect of the present invention, there is provided a corrugated pipe connection device including a corrugated pipe including a groove and a ridge that are successively and alternately formed, a nut into which a one-side portion of the corrugated pipe is inserted, a clamping ring including an inner portion configured to be inserted into the groove formed in the one-side portion of the corrugated pipe, and a socket screwed to the nut, wherein the socket is formed on a front surface thereof with an outer protrusion that protrudes towards the clamping ring in a longitudinal direction so as to be inserted between an inner circumferential surface of the nut and an outer circumferential surface of the clamping ring upon screwing of the socket and the nut.

In accordance with a further aspect of the present invention, there is provided a coupling method of a corrugated pipe connection device, the method including primarily screwing a nut and a socket after interposing a clamping ring between the nut and the socket, inserting a one-side portion of a corrugated pipe, including a groove and a ridge that are successively and alternately formed, into the nut, and secondarily screwing the nut and the socket so that an inner portion of the clamping ring is inserted into the groove of the corrugated pipe and a distal end of the corrugated pipe is pressed.

One side surface of the clamping ring may be brought into contact with a tip end of an outer protrusion formed on a front surface of the socket upon the primary screwing of the nut and the socket. Upon the secondary screwing of the nut and the socket, at least one side surface of the clamping ring may be accommodated in a space that is located radially inwards of the outer protrusion and the distal end of the corrugated pipe is pressed between the clamping ring and the socket.

The side surface of the clamping ring and the distal end of the corrugated pipe may come into contact with a packing member that is inserted into a groove formed between an inner protrusion and the outer protrusion formed on the front surface of the socket.

In addition, after the primarily screwing the nut and the socket ends, the method further includes sealing a gap between the nut and the socket by attaching a piece of tape to the nut and the socket primarily screwed to each other, so that the nut and the socket are secondarily screwed to each other as the piece of tape is torn in the secondarily screwing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
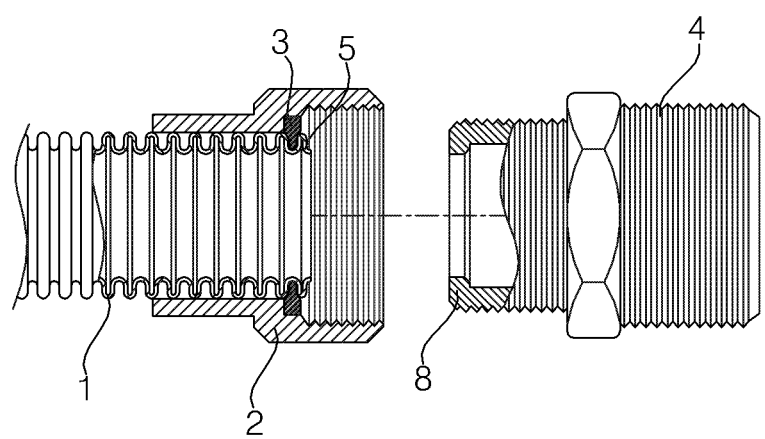
FIG. 1 is an exploded cross-sectional view of a corrugated pipe connection device according to the related art.
Figure 2:
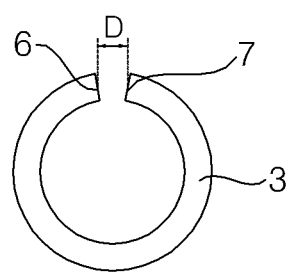
FIG. 2 is a front view illustrating a clamping ring of FIG. 1.
Figure 3A:
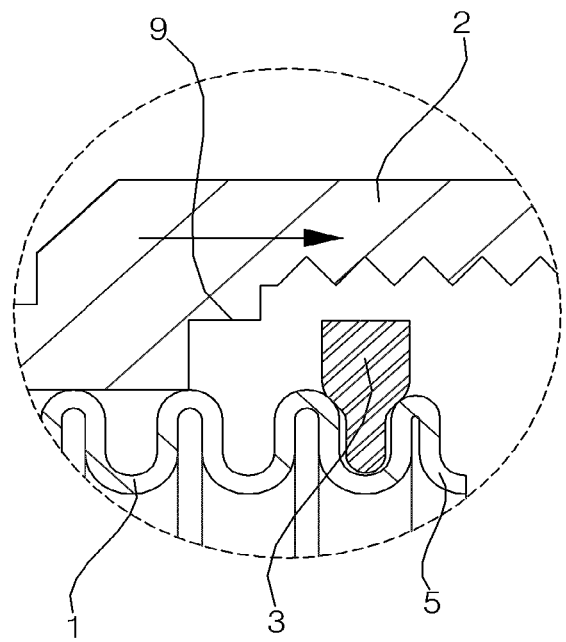
FIGS. 3A and 3B are partial cross-sectional views illustrating the sequence of coupling the corrugated pipe connection device of FIG. 1.
Figure 3B:
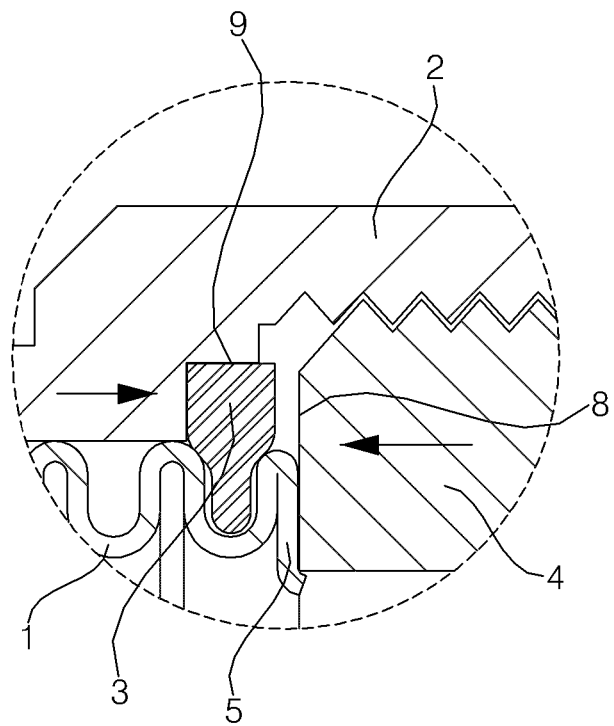

Expressions designating directions, such as "front surface", "one side portion", "distal end", and "tip end", used hereinafter are defined according to the illustrations in the drawings, but are merely intended to describe the present invention so as to assist clear understanding thereof, and the respective directions may also of course be differently defined according to the criterion thereof.

In addition, terms such as, for example, "first" and "second", applied to components mentioned hereinafter are used to avoid confusion of the components, and are assigned regardless of the order, importance, master-servant relationship, or the like of the components. For example, the present invention may be realized by including only a second component without a first component.

Hereinafter, a first embodiment of a corrugated pipe connection device according to the present invention will be described with reference to FIGS. 4 to 7.

Figures 4, 5:
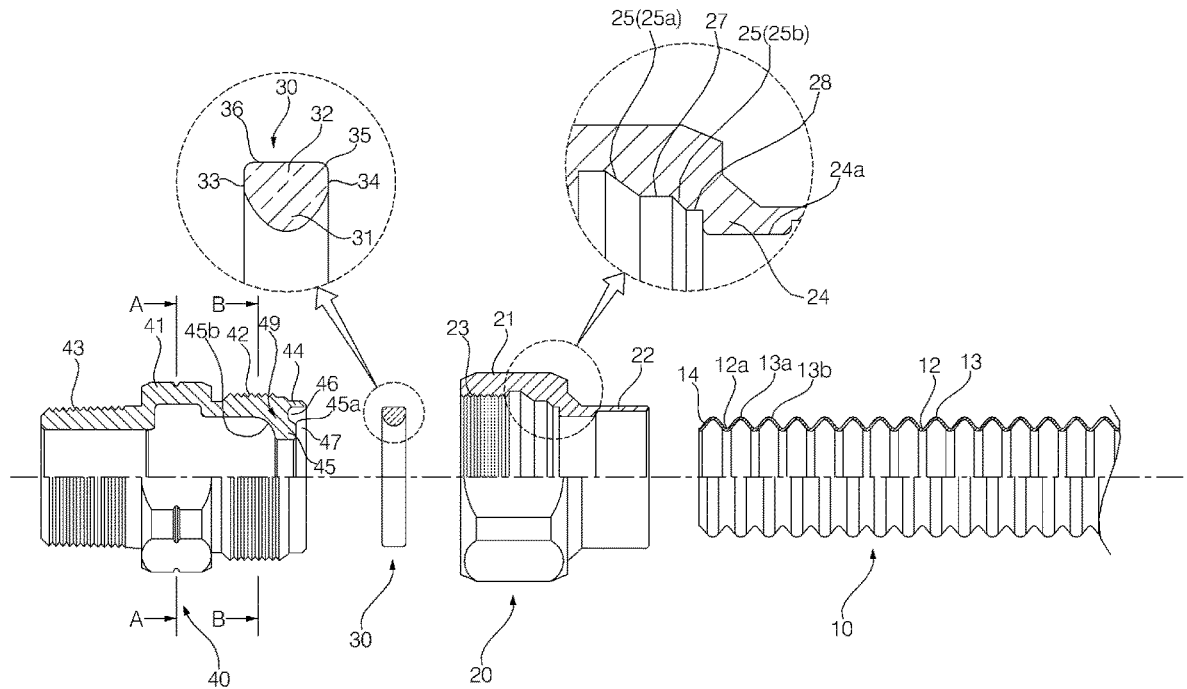
FIG. 4 is an exploded view illustrating a first embodiment of a corrugated pipe connection device according to the present invention, the upper half part being a cross-sectional view and the lower half part being a front view.
FIG. 5 is a cross-sectional view illustrating the completely coupled state of the first embodiment of the present invention.

The first embodiment of the corrugated pipe connection device according to the present invention, as illustrated in FIGS. 4 and 5, includes a corrugated pipe 10 formed with successive wavy corrugations 12 and 13 therearound, a nut 20 having a one-side portion inserted around the corrugated pipe 10 so as to surround the outer circumferential surface of the corrugated pipe 10, a clamping ring 30 coupled to the corrugated pipe 10 to stop the movement of the nut 20 in a given direction, and a socket 40 screwed to the nut 20.

Here, the wavy corrugations 12 and 13 formed on the corrugated pipe 10 are successively formed around the pipe. In each corrugation, the smallest-diameter portion is referred to as a "groove 12" and the largest-diameter portion is referred to as a "ridge 13".

The nut 20 is composed of a flange portion 21, which is disposed towards the socket 20 and has an inner diameter considerably larger than the outer diameter of the ridge 13 of the corrugated pipe 10, and a cylindrical portion 22, which is provided at the opposite side of the socket 40 and has an inner diameter smaller than that of the flange portion 21.

The flange portion 21 is formed with a female screw-thread 23 on the inner circumferential surface of the one-side portion thereof facing the socket 40. A stepped portion 24 protrudes radially inwards from the inner circumferential surface of the nut 20 between the flange portion 21 and the cylindrical portion 22 so as to come into contact with one-side surface 34 of the clamping ring 30.

As illustrated in FIG. 5, the stepped portion 24 extends in the longitudinal direction of the nut 20 so that an inner circumferential surface 24a of the stepped portion 24 comes into contact with at least two ridges 13a and 13b of the corrugated pipe 10 when the corrugated pipe connection device is completely coupled.

In addition, referring to FIGS. 4 and 5, the nut 20 is formed with a slope 25, which presses the clamping ring 30 radially inwards, and a first seat portion 28, on which the clamping ring 30 is seated, in sequence from the region in which the female screw-thread 23 is formed to the region in which the stepped portion 24 is formed.

The slope 25 may be composed of first and second slopes 25a and 25b spaced apart from each other, and a second seat portion 27 may be formed between the first slope 25a and the second slope 25b.

The slope 25 is formed in a manner such that the diameter thereof is gradually reduced with decreasing distance to the first seat portion 28. As the nut 20 moves towards the clamping ring 30, the slope 25 is brought into contact with an edge 35 of the upper corner of the clamping ring 30, thereby functioning to allow the clamping ring 30 to be pressed radially inwards and guided to the first seat portion 28 so as to be easily and forcibly press-fitted into the first seat portion 28. This will be described below in more detail.

Figure 9:
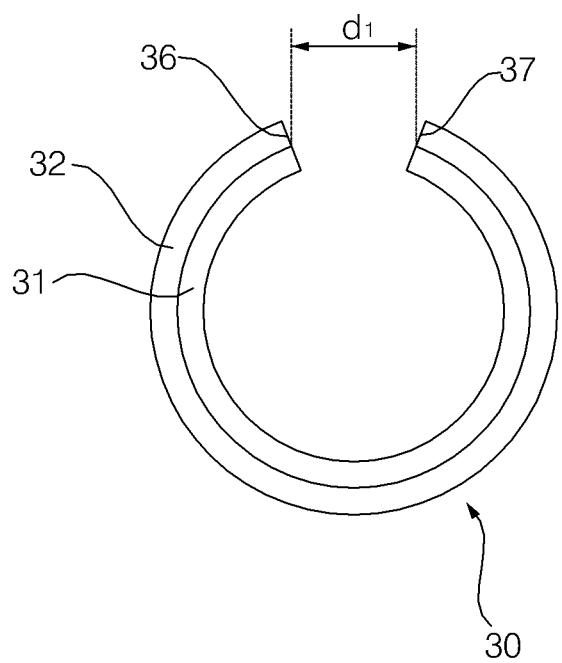
FIGS. 9 and 10 are front views of a clamping ring according to the first embodiment of the present invention, FIG. 9 illustrating the shape of the clamping ring before the clamping ring is coupled to the corrugated pipe connection device, and FIG. 10 illustrating the shape of the clamping ring after the clamping ring is completely coupled.

The clamping ring 30 may be formed of a metal material such as stainless steel. As illustrated in FIG. 9, the clamping ring 30 takes the form of a ring that is cut at at least a position so that both ends 36 and 37 thereof are spaced apart from each other by a predetermined distance d1 in order to enable contraction and expansion of the clamping ring 30 in the radial direction.

In addition, as illustrated in the cross-sectional views of FIGS. 4 and 5, the clamping ring 30 includes an inner portion 31, which is located at the radial inner side and is inserted into a groove 12a of the corrugated pipe 10, and an outer portion 32, which is located at the radial outer side and protrudes outwards from the corrugated pipe 10. The inner portion 31 is formed as a curved portion, the center of which is convex radially inwards, and the outer portion 32 is formed to have a rectangular shape and has an outer circumferential surface 36 and opposite side surfaces 33 and 34.

Referring to FIGS. 4 to 8, the socket 40 includes a fastening portion 40a, which is disposed at one side of the socket 40 and is formed on the outer circumferential surface thereof with a male screw-thread 42, which is screwed to the female screw-thread 23 of the nut 20, for fastening with the nut 20, a connection portion 40c, which is disposed at the other side of the socket 40 opposite the fastening portion 40a and is formed on the outer circumferential surface thereof with a screw-thread 43, which is screwed to a joint (not illustrated), and an exposed portion 40b, which is located between the fastening portion 40a and the connection portion 40c so as to be exposed to the outside and has a hexagonal outer circumferential surface like a bolt head portion.

Alternatively, the screw-thread 43 formed on the connection portion 40c may be formed on the inner circumferential surface of the connection portion 40c, rather than being formed on the outer circumferential surface of the connection portion 40c.

The exposed portion 40b extends from the fastening portion 40a of the socket 40, which is covered with the nut 21, in a direction opposite the clamping ring 30. The exposed portion 40b has a hexagonal outer circumferential surface in the embodiment of the present invention, but may have any other shape.

Figure 6:
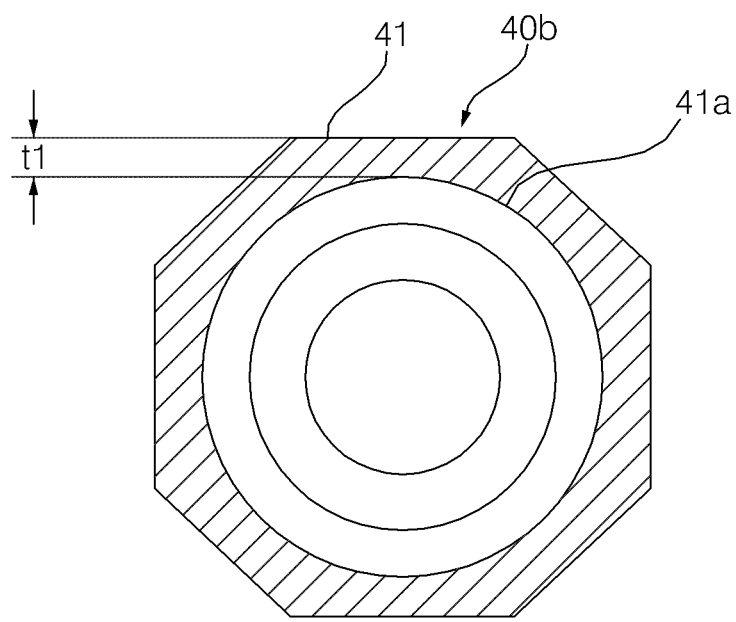
FIG. 6 is a cross-sectional view taken along line A-A of FIG. 4.
Figure 7:
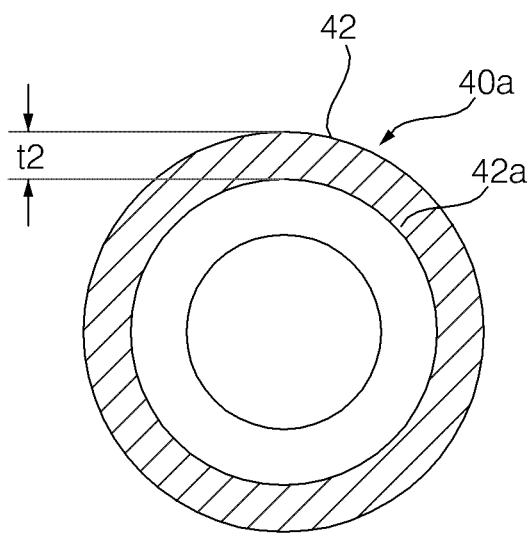
FIG. 7 is a cross-sectional view taken along line B-B of FIG. 4.

Referring to FIGS. 5 to 7, the exposed portion 40b is formed in a manner such that the outer circumferential surface thereof protrudes radially outwards from the fastening portion 40a and the connection portion 40c located at opposite sides thereof.

An inner circumferential surface 41a of the exposed portion 40b is recessed radially further outwards than an inner circumferential surface 42a of the fastening portion 40a and an inner circumferential surface 43a of the connection portion 40c, so that an annular space C1 is defined between the inner circumferential surfaces 42a and 43a of the fastening portion 40b and the connection portion 40c.

Thus, when an external impact is applied to the socket 40, the annular space C1 may absorb and alleviate the impact.

Referring to FIGS. 6 and 7, the smallest thickness t1 of the exposed portion 40b is equal to or less than the thickness t2 of the fastening portion 40a. As such, when an external impact is applied to the socket 40, the exposed portion 40b may absorb the impact while being deformed.

Accordingly, since the exposed portion 40b and the annular space C1 absorb and alleviate an external impact even if the impact is directly applied to the socket 40 or the nut 20, deformation around the clamping ring 30 is prevented or reduced and consequently, sealing efficiency is maintained.

Meanwhile, referring to FIG. 4, a front surface 49 of the socket 40, which corresponds to the right surface of the socket 40, is formed on the radial outer edge thereof with a ring-shaped outer protrusion 44, which protrudes towards the clamping ring 30 in the longitudinal direction of the socket 40. When the socket 40 and the nut 20 are primarily screwed to each other, one side surface 33 of the clamping ring 30 comes into contact with the tip end of the outer protrusion 44 and a space 47 is defined in the radially inward direction of the outer protrusion 44. In addition, the front surface 49 of the socket 40 is formed on the radial inner edge thereof with a ring-shaped inner protrusion 45, which protrudes in the longitudinal direction of the socket 40 for pressing a distal end 14 of the corrugated pipe 10.

An annular groove 46 is formed between the inner and outer protrusions 45 and 44 so as to be recessed towards a hexagonal head portion 41. The groove 46 constitutes a portion of the space 47. The inner protrusion 45 is shorter than the outer protrusion 44 and has an angled upper edge 45a, which is in contact with the groove 46. The upper edge 45a defines an angle of substantially 90 degrees.

The upper edge 45a of the inner protrusion 45 comes into linear contact with the distal end 14 of the corrugated pipe 10, which is formed so as to face the inner portion 31 of the clamping ring 30, and forcibly presses the distal end 14 towards the inner portion 31 of the clamping ring 30 when the corrugated pipe connection device is completely coupled.

In addition, the inner protrusion 45 protrudes radially inwards from the inner circumferential surface of the socket 40. Specifically, since the inner protrusion 45 protrudes radially inwards from the inner circumferential surface of the socket 40 so as to be rounded at an obtuse angle, a thick reinforcement portion 45b is formed at the connection region between the inner protrusion 45 and the inner circumferential surface of the socket 40. Thereby, even if a significant external impact is applied to the corrugated pipe connection device, sealing efficiency is maintained since the reinforcement portion 45b prevents the inner protrusion 45 from bending in a direction opposite the corrugated pipe 10.

As illustrated in FIG. 5, a space C2 is formed inside the female screw-thread 23 of the nut 20, which is screwed to the male screw-thread 42 of the socket 40, so as to be slightly recessed radially outwards. Thereby, since the space C2 absorbs an external impact when the impact is applied to the nut 20 or the socket 40, deformation around the clamping ring 30 is prevented or reduced and consequently, sealing efficiency is maintained.

The sequence of coupling the corrugated pipe connection device according to the first embodiment of the present invention having the above-described configuration will be described below with reference to FIGS. 8A to 8F.

Figure 8A:
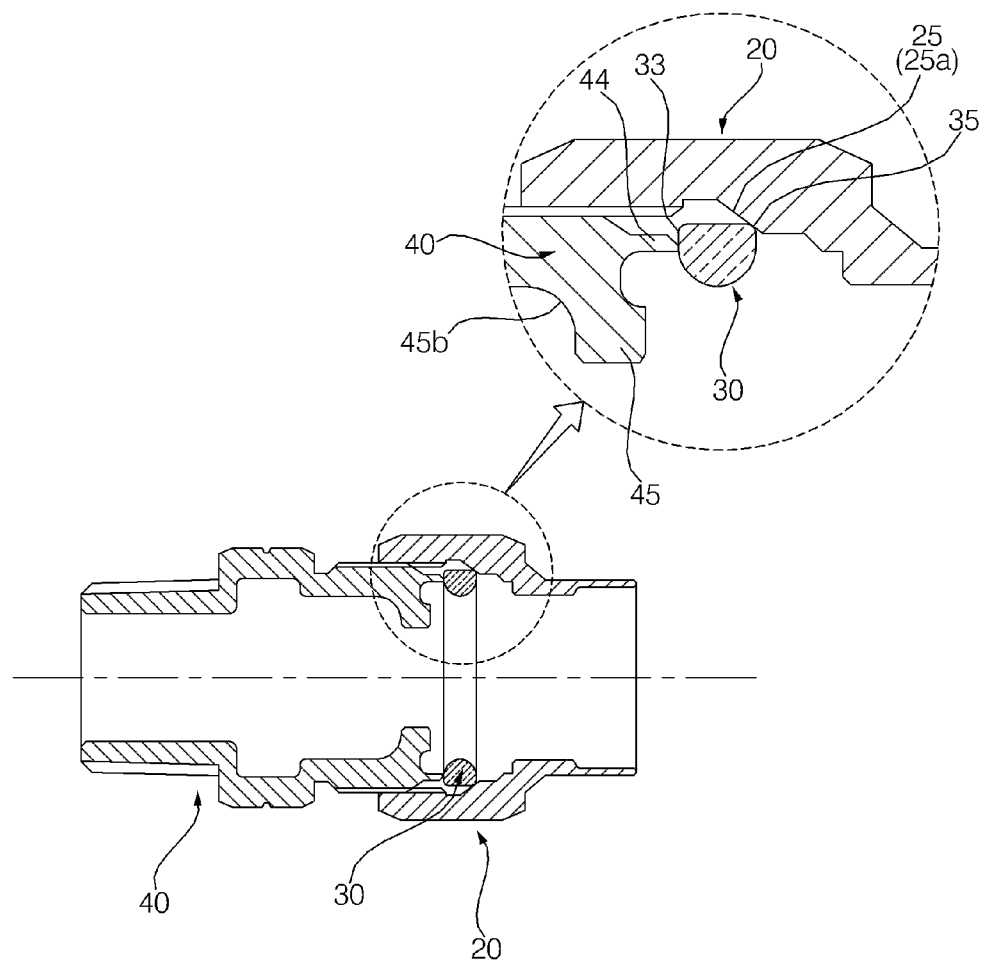
FIGS. 8A to 8F are cross-sectional views illustrating sequential coupling steps of the first embodiment of the present invention.

As illustrated in FIG. 8A, prior to installing the corrugated pipe connection device of the present invention on site, first, after the clamping ring 30 is interposed between the nut 20 and the socket 40, at least one of the nut 20 and the socket 40 is tightened (rotated) so that the nut 20 and the socket 40 are primarily screwed to each other. Thereby, the side surface 33 of the clamping ring 30 is brought into contact with the tip end of the outer protrusion 44 of the socket 40 and the upper edge 35 located at the upper side of the other side surface of the clamping ring 30 is brought into contact with the first slope 25a of the nut 20.

At this time, the clamping ring 30 is not pressed or expanded in the radial direction, and as illustrated in FIG. 9, the two ends 36 and 37 of the clamping ring 30 maintain the distance d1 therebetween, which is set at the stage of manufacture. Thus, the worker may simply dispose the clamping ring 30 between the nut 20 and the socket 40 without having to expand the clamping ring 30 in order to insert the clamping ring 30 into the groove of the corrugated pipe 10.

That is, in the step of primarily screwing the nut 20 and the socket 40 to each other illustrated in FIG. 8A, the clamping ring 30 maintains the original shape thereof at the stage of manufacture without deformation.

Figure 8B:
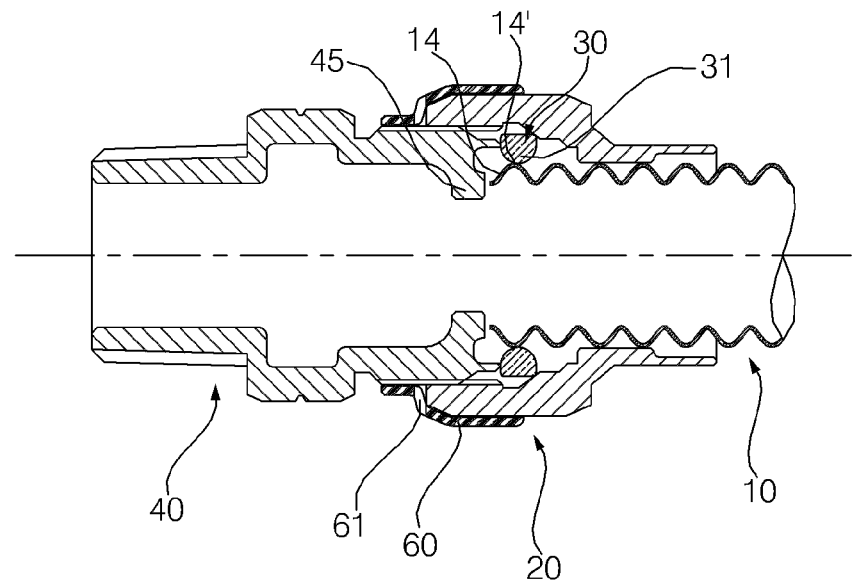

Next, as illustrated in FIG. 8B, a piece of tape 60 is attached to surround at least a portion of the outer circumferential surfaces of the nut 20 and the socket 40, which have been primarily screwed to each other, so as to seal the gap between the nut 20 and the socket 40.

The piece of tape 60 may be attached so as to partially or entirely surround the boundary between the nut 20 and the socket 40 in the circumferential direction, or may be attached to locally cover the outer circumferential surfaces of the nut 20 and the socket 40 in the longitudinal direction.

The piece of tape 60 is formed with a tear line 61 along the boundary between the outer circumferential surfaces of the nut 20 and the socket 40. Since the tear line 61 is easily torn when the nut 20 and the socket 40 are tightened, the nut 20 and the socket 40 may be tightened relatively easily. The tear line 61 may be formed of a plurality of small holes.

Figure 8C:
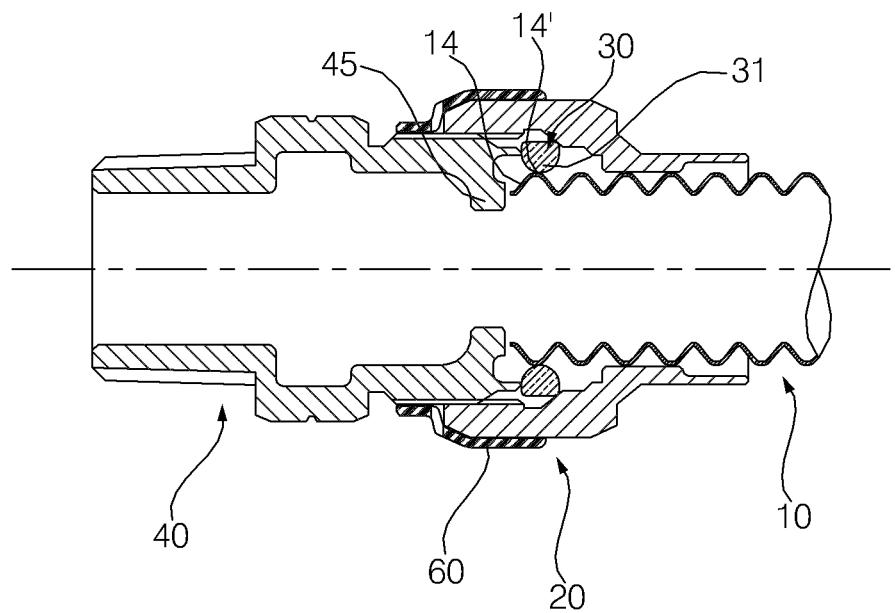

As illustrated in FIG. 8C, when the worker pushes the one-side portion of the corrugated pipe 10 into the nut 20 towards the socket 40, the lower surface of the inner portion 31 of the clamping ring 30 is brought into contact with a ridge 14' formed on the distal end 14 of the corrugated pipe 10, and the distal end 14 of the corrugated pipe 10 is located close to the inner protrusion 45 of the socket 40.

Meanwhile, since the clamping ring 30 is formed in a manner such that the inner diameter of the lower surface of the inner portion 31 thereof is slightly smaller than the outer diameter of the ridge 14' of the corrugated pipe 10, the corrugated pipe 10 is inserted into the clamping ring 30 upon receiving slight force applied thereto.

Figure 8D:
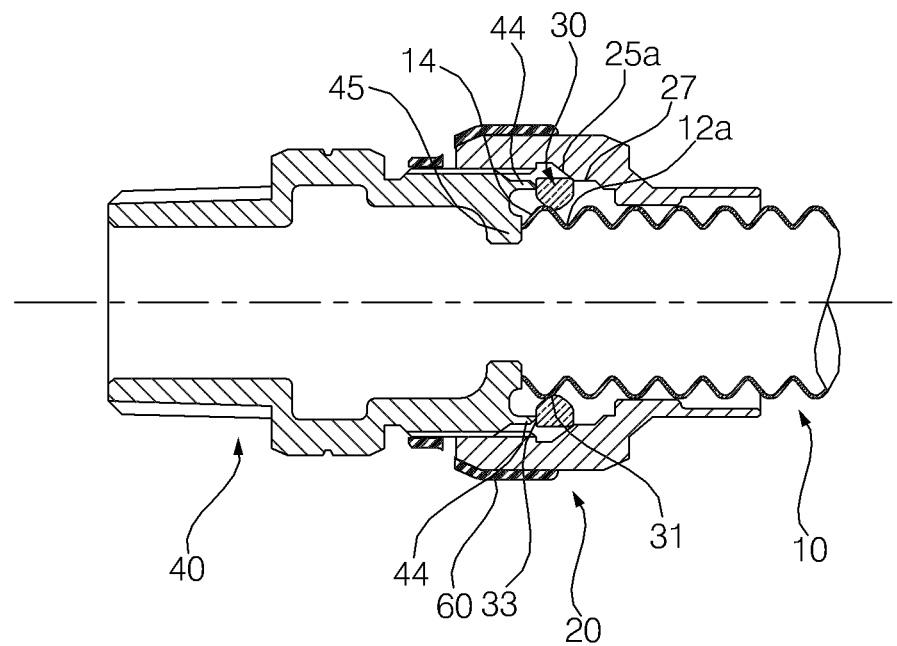

In such a state, as illustrated in FIG. 8D, when the nut 20 and/or the socket 40 are rotated so that both are further tightened, the clamping ring 30 is pressed radially inwards until it reaches the second seat portion 27 along the first slope 25a. Thereby, the inner portion 31 of the clamping ring 30 begins to be inserted into the groove 12a formed in the one-side portion of the corrugated pipe 10, the distal end 14 of the corrugated pipe 10 begins to be brought into contact with and pressed by the inner protrusion 45 of the socket 40, and the piece of tape 60 begins to be torn along the tear line 61.

The side surface 33 of the clamping ring 30 remains in contact with the tip end of the outer protrusion 44 of the socket 40 from the state of FIG. 8A to the state of FIG. 8D.

Figure 8E:
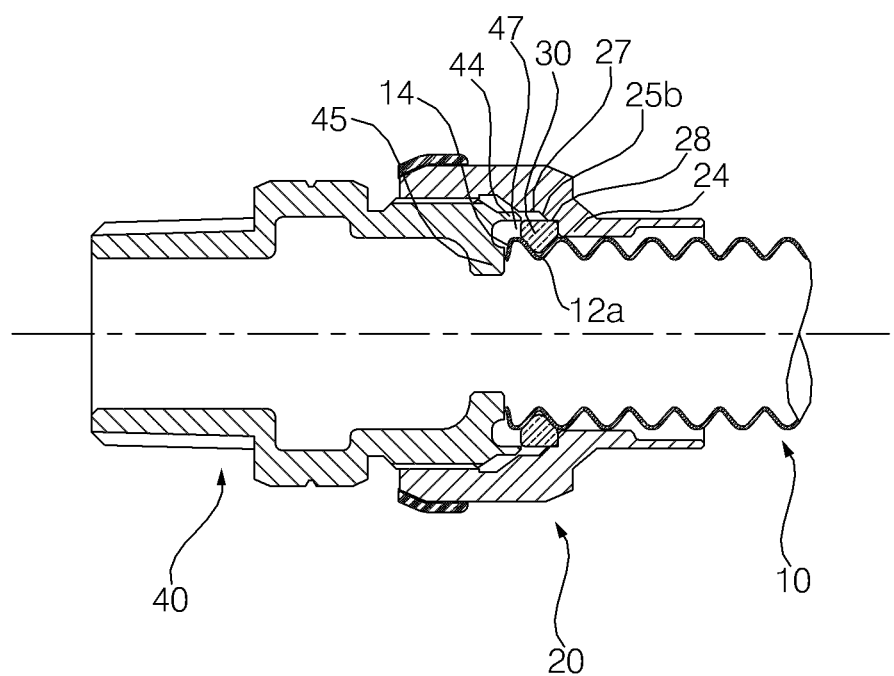

When the nut 20 and the socket 40 are further tightened in the state of FIG. 8D, as illustrated in FIG. 8E, the piece of tape 60 is completely torn along the tear line 61, and the clamping ring 30 is further pressed radially inwards along the second slope 25b while being guided from the second seat portion 27 to the first seat portion 28 by way of the second slope 25b, thereby being inserted into the groove 12a formed in the one-side portion of the corrugated pipe 10. At this time, the clamping ring 30 begins to be introduced into the space 47 formed radially inwards of the outer protrusion 44, and the outer protrusion 44 begins to be introduced into the gap between the clamping ring 30 and the second seat portion 27.

In addition, the distal end 14 of the corrugated pipe 10 is pressed towards the clamping ring 30 by the inner protrusion 45.

Figure 8F:
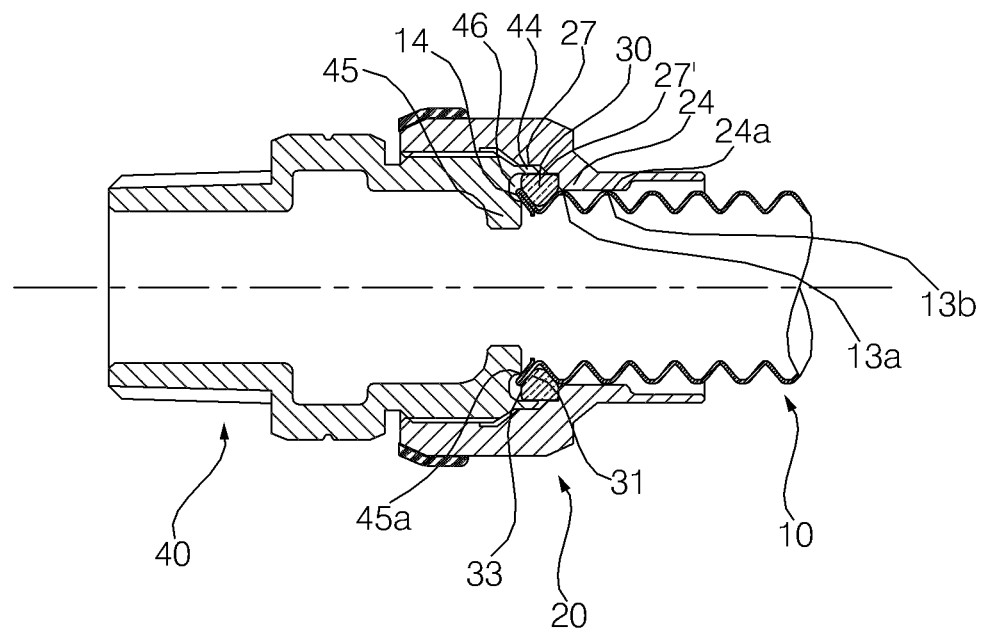

When the nut 20 and the socket 40 are further tightened in the state of FIG. 8E, as illustrated in FIG. 8F, the clamping ring 30 is pressed towards the socket 40 by the stepped portion 24 of the nut 20 so that at least one side surface 33 of the clamping ring 30 is introduced into the groove 46 in the socket 20.

In addition, the outer protrusion 44 of the socket 40 is seated on the second seat portion 27 and the upper edge 45a of the inner protrusion 45 further presses the distal end 14 of the corrugated pipe 10 towards the clamping ring 30. Thereby, the gap between the inner circumferential surface of the nut 20 and the outer circumferential surface of the clamping ring 30 and the gap between the upper edge 45a of the inner protrusion 45 of the socket 40 and the inner portion 31 of the clamping ring 30 are completely sealed.

Meanwhile, as described above, since the upper edge 45a of the inner protrusion 45 is angled at substantially 90 degrees and the inner portion 31 of the clamping ring 30 facing thereto is formed as a curved portion, when the upper edge 45a comes into linear contact with the distal end 14 of the corrugated pipe 10, pressing force is concentrated on the linear contact portion, so that the distal end 14 of the corrugated pipe 10 may be more strongly pressed with low force, which results in enhanced sealing efficiency.

The screwing of the socket 40 and the nut 20 from the state of FIG. 8E to the completion of coupling of FIG. 8F is referred to as secondary screwing. Upon such secondary screwing, the clamping ring 30 is release from the contact with the inner protrusion 45 and is introduced into the groove 46, which is a space.

Figure 10:
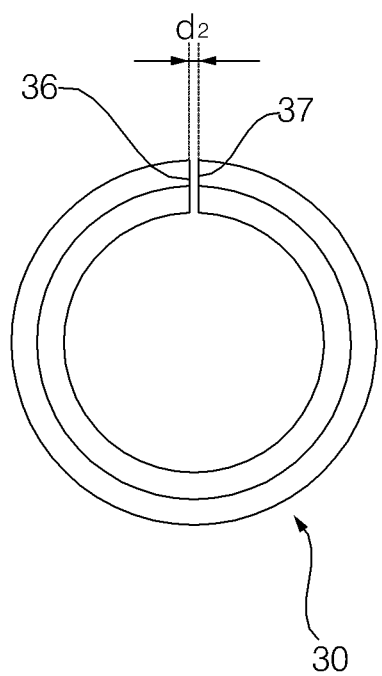

Meanwhile, the clamping ring 30 is pressed radially inwards by the first and second slopes 25a and 25b in the coupling process described above. Thereby, as illustrated in FIGS. 9 and 10, the distance between the two ends 36 and 37 is reduced from the distance d1 to the distance d2, and in the completely coupled state, the distance d2 becomes almost zero.

In addition, the coupled state of FIG. 8F is the state in which the nut 20 and the socket 40 are completely screwed to each other, and the corrugated pipe connection device in the state of FIG. 8F is installed and used on site. In consideration of the fact that a slight space 27' is present between the end of the outer protrusion 44 of the socket 40 and the second slope 25b, when there is a risk of fluid leakage during the use of the corrugated pipe connection device, the outer protrusion 44 is moved towards the second slope 25b so as to be inserted into the space 27' simply by further tightening the nut 20 without dismantling or replacing constituent elements of the corrugated pipe connection device, which may result in enhanced sealing efficiency.

In addition, the thickness of the outer protrusion 44 and/or the inner diameter of the second seat portion 27 are gradually reduced in the direction in which the outer protrusion 44 is moved, so that the outer protrusion 44 is easily inserted between the second seat portion 27 and the outer circumferential surface 36 of the clamping ring 30. In addition, since the clamping ring 30 is disposed perpendicular to the center axis of the corrugated pipe 10, sealing efficiency is further enhanced.

Meanwhile, upon completion of the coupling of the corrugated pipe connection device according to the present invention, since an inner surface 24a of the stepped portion 24 of the nut 20 longitudinally extends from the clamping ring 30 in a direction opposite the socket 40 so as to come into contact with at least two ridges 13a and 13b of the corrugated pipe 10, even if bending of the corrugated pipe 10 occurs due to an external impact applied to the corrugated pipe connection device or a change in the installation position of the corrugated pipe 10, a sealing region around the clamping ring 30 is maintained without deformation and fluid leakage is prevented. In addition, since the predetermined space 27' is defined between the end of the outer protrusion 44 and the second slope 25b, an external impact is absorbed by the space 27'. In addition, since the clamping ring 30 and the inner and outer protrusions 45 and 44, which greatly affect sealing, are disposed in the body of the nut 20 so as to be deviated to one side towards the corrugated pipe 10, even if an external impact is directly applied to the center of the body of the nut 20, the clamping ring 30 and the inner and outer protrusions 45 and 44 are deformed less, and consequently, sealing efficiency is maintained.

Figure 11:
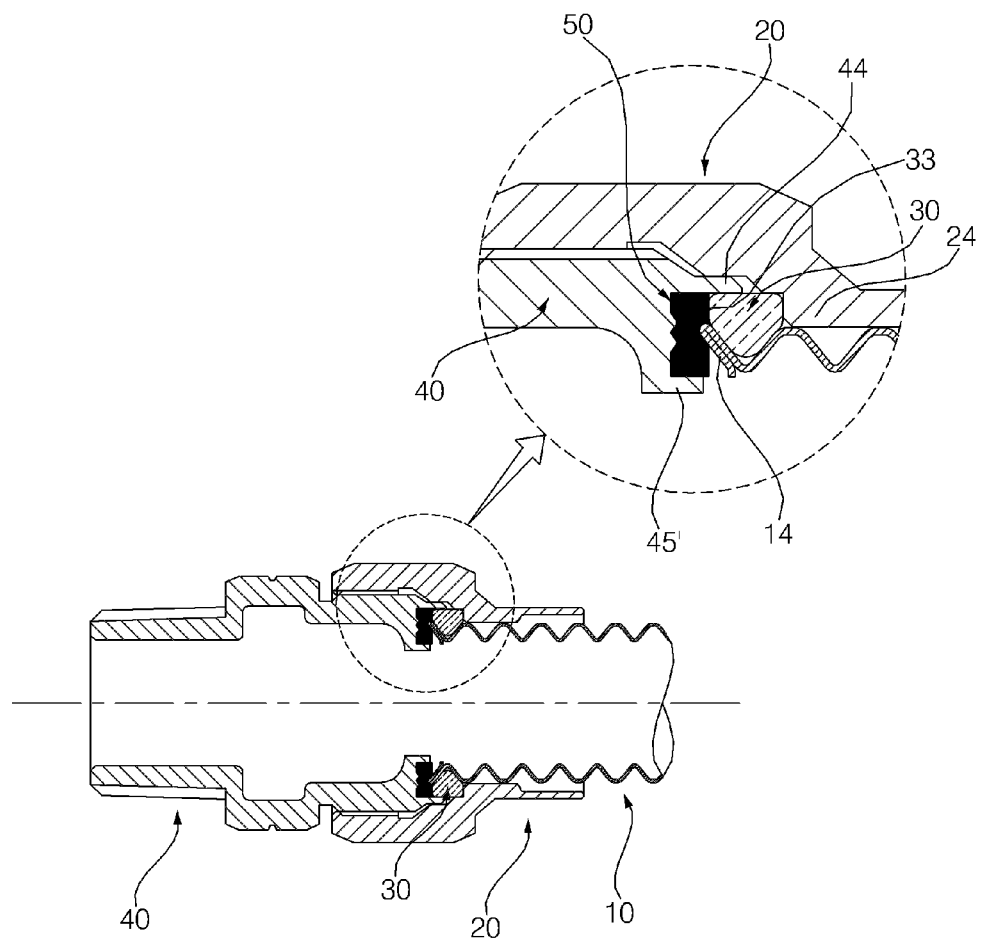
FIG. 11 is a cross-sectional view of a second embodiment of a corrugated pipe connection device according to the present invention, illustrating the completely coupled state thereof.
Figure 12:
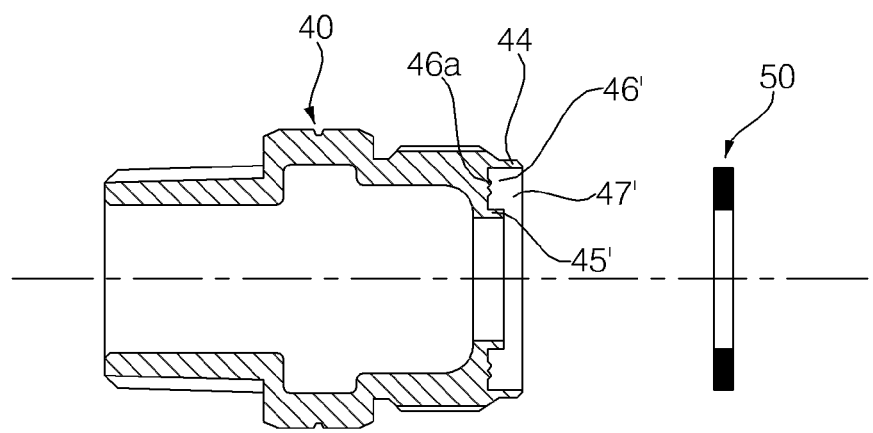
FIG. 12 is an exploded cross-sectional view illustrating a socket and a packing member of the second embodiment of the present invention.
Figure 13A:
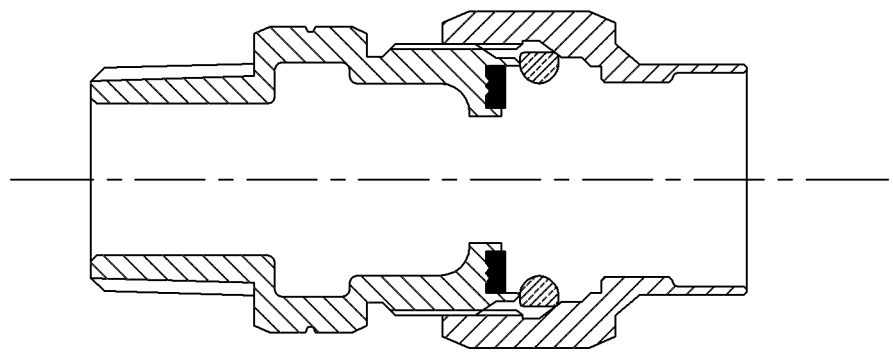
FIGS. 13A to 13F are cross-sectional views illustrating sequential coupling steps of the second embodiment of the present invention.
Figure 13B:
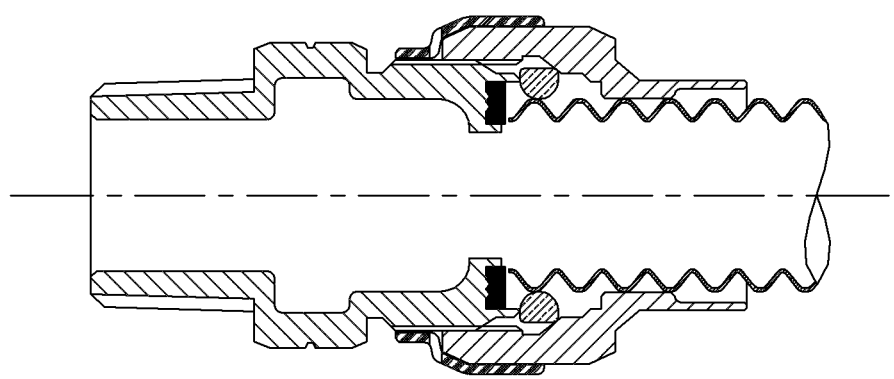
Figure 13C:
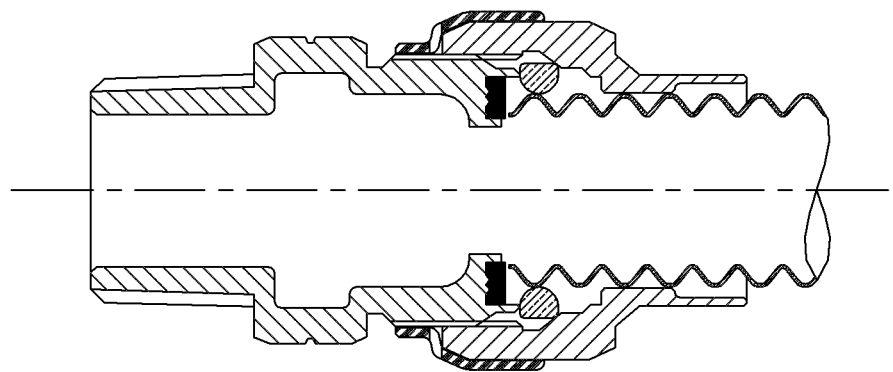
Figure 13D:
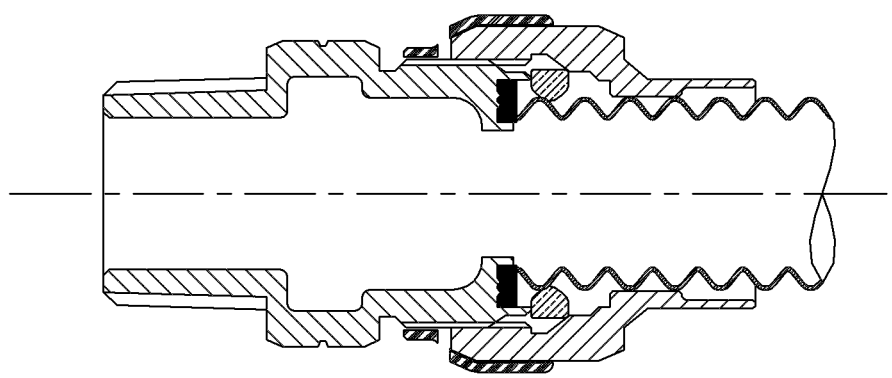
Figure 13E:
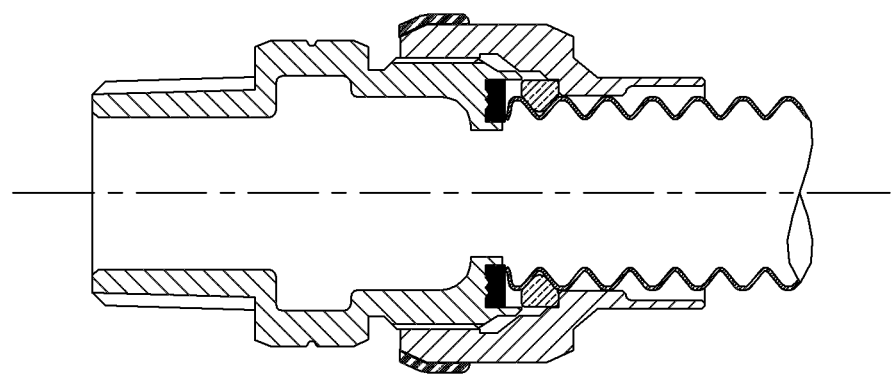
Figure 13F:
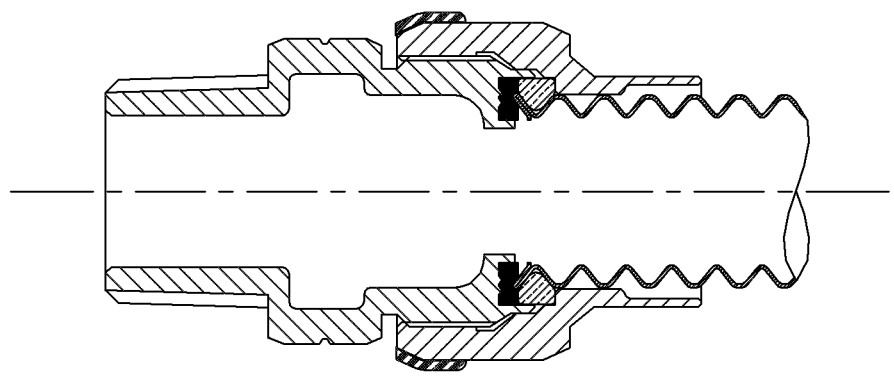

FIGS. 11 to 13 illustrate a second embodiment of the corrugated pipe connection device according to the present invention.

Referring to FIG. 11, the second embodiment of the corrugated pipe connection device according to the present invention includes the corrugated pipe 10, the nut 20, the clamping ring 30, and the socket 40, similarly to the first embodiment.

The following description is centered on differences between the second embodiment and the first embodiment of the present invention.

In the second embodiment of the present invention, as illustrated in FIGS. 11 and 12, an inner protrusion 45' formed on the front surface of the socket 40 is located radially further inwards than the inner protrusion 45 of the first embodiment so as not to come into contact with the distal end 14 of the corrugated pipe 10.

In addition, a ring-shaped packing member 50, which is not included in the first embodiment, is inserted into a groove 46', which is formed between the outer protrusion 44 and the inner protrusion 45' of the socket 40. Upon the secondary screwing of the socket 40 and the nut 20, the side surface 33 of the clamping ring 30 and the distal end 14 of the corrugated pipe 10 are brought into contact with the packing member 50, so that the clamping ring 30 presses the packing member 50 towards the socket 40 and the packing member 50 presses the distal end 14 of the corrugated pipe 10 towards the clamping ring 30.

Meanwhile, the packing member 50 may be formed of a synthetic resin or a soft metal having excellent heat resistance, high mechanical strength, and excellent corrosion resistance and wear resistance.

In addition, one side surface of the socket 40, which defines the groove 46' for the insertion of the packing member 50, is formed with a boss 46a. When the packing member 50 is pressed or when the distal end 14 of the corrugated pipe 10 is pressed by the packing member 50, the packing member 50 remains at the correct position and is prevented from moving by the boss 46a.

In particular, the second embodiment of the present invention provides enhanced sealing efficiency since the front surface of the packing member 50 presses and comes into close contact not only with the side surface 33 of the clamping ring 30 but also with the distal end 14 of the corrugated pipe 10.

The second embodiment of the present invention is the same as the first embodiment except for the packing member 50 and the position of the inner protrusion 45', and thus a further description related to the configuration of the second embodiment is omitted.

FIGS. 13A to 13F are views illustrating a coupling method of the second embodiment of the present invention, and correspond respectively to FIGS. 8A to 8F of the first embodiment. The coupling sequence of the second embodiment is the same as that of the first embodiment, and thus a further description thereof is omitted herein.

As is apparent from the above description, according to a corrugated pipe connection device and a coupling method of the present invention, a clamping ring is interposed between a nut and a socket and the nut is tightened so that the nut and the socket are primarily screwed to each other. Then, a one-side portion of a corrugated pipe is inserted into the nut and the nut is further tightened so that the nut and the socket are secondarily screwed to each other. Thereby, it is possible to simply and easily couple the corrugated pipe connection device.

In addition, according to the corrugated pipe connection device and the coupling method of the present invention, since the clamping ring may be interposed and coupled between the nut and the socket while the shape thereof is maintained at the stage of manufacture without having to expand by receiving external force from the worker, it is possible to enhance the coupling efficiency and sealing efficiency of the corrugated pipe connection device.

In addition, according to the corrugated pipe connection device and the coupling method of the present invention, since at least one side surface of the clamping ring is accommodated in a groove formed between an outer protrusion and an inner protrusion on the front surface of the socket, and a distal end of the corrugated pipe is brought into linear contact with and is pressed by an angled edge formed on the inner protrusion, it is possible to easily bring the distal end of the corrugated pipe into close contact with the socket and the clamping ring with low force.

In addition, in the corrugated pipe connection device according to the present invention, since the inner protrusion protrudes radially inwards from the inner circumferential surface of the socket so as to be rounded at a large obtuse angle and since the inner circumferential surface of the nut comes into contact with at least two ridges of the corrugated pipe which are located opposite the socket, it is possible to maintain a sealing region and prevent fluid leakage even if an external impact is applied or even if the position of the corrugated pipe is changed.

In addition, according to the corrugated pipe connection device and the coupling method of the present invention, since a packing member inserted into a groove between the inner and outer protrusions formed on the front surface of the socket presses and comes into close contact with the side surface of the clamping ring and the distal end of the corrugated pipe, it is possible to enhance sealing efficiency.

In addition, in the corrugated pipe connection device according to the present invention, since the outer protrusion formed on the front surface of the socket is inserted between the inner circumferential surface of the nut and the outer circumferential surface of the clamping ring, it is possible to enhance sealing efficiency.

In addition, in the corrugated pipe connection device according to the present invention, since the outer protrusion of the socket is further introduced into the gap between the inner circumferential surface of the nut and the outer circumferential surface of the clamping ring by tightening the nut so as to further enhance sealing efficiency, it is possible to simply perform a repair operation of the corrugated pipe connection device without dismantling or replacing constituent elements thereof.

In addition, in the corrugated pipe connection device according to the present invention, since the inner circumferential surface of an exposed portion of the socket is recessed radially further outwards than the inner circumferential surface of a fastening portion of the socket so as to define an annular space which is capable of absorbing impact applied to the inner circumferential surface of the socket, it is possible to maintain sealing efficiency even if impact is applied.

In addition, according to the corrugated pipe connection device and the coupling method of the present invention, after the clamping ring is interposed between the nut and the socket and the nut and the socket are primarily screwed to each other, the nut and the socket are sealed using a piece of tape and then are installed on site, so that the coupling of the corrugated pipe connection device is completed in a simplified manner by inserting the corrugated pipe into the nut of the sealed nut-and-socket assembly and tightening the nut and the socket. Thereby, it is possible to achieve simplified easy coupling of the corrugated pipe connection device.

In addition, according to the corrugated pipe connection device and the coupling method of the present invention, since the sealed nut-and-socket assembly, which is appropriately tightened to allow the corrugated pipe to be inserted later and is sealed using a piece of tape, is provided in the state in which the clamping ring is provided in advance, it is possible to prevent the corrugated pipe connection device from being installed without the clamping ring therein and to prevent the nut and the socket from being primarily screwed to each other so that the corrugated pipe may not be inserted therebetween.

The embodiments of a corrugated pipe connection device according to the present invention have been disclosed in detail with reference to the accompanying drawings. However, it should be noted that the present invention is not limited by the above-described embodiments, and those skilled in the art will appreciate that various modifications, additions and substitutions are possible, without departing from the scope and spirit of the invention.

What is claimed is:

1. A corrugated pipe connection device comprising:
    a corrugated pipe comprising a groove and a ridge that are successively and alternately formed;
    a nut into which one side portion of the corrugated pipe is inserted, wherein the nut has a screw-thread on an inner circumferential surface thereof;
    a clamping ring being formed in a ring shape cut at one place thereof and comprising an inner portion formed convexly in a radially inward direction of the corrugated pipe to be inserted into the groove of the corrugated pipe and an outer portion protruded in a radially outward direction from the inner portion, wherein the outer portion comprises an outer circumferential surface; and
    a socket having a screw-thread on an outer circumferential surface thereon onto which the nut is screwed,
    wherein the inner circumferential surface of the nut is formed with a first seat portion on which the clamping ring is seated and a second seat portion on which an outer protrusion is seated,
    wherein the socket is formed on a front surface thereof with an outer protrusion having no screw-thread thereon protruding towards the clamping ring in a longitudinal direction of the socket, wherein an outer diameter of the outer protrusion is smaller than an outer diameter of the screw-thread of the socket,
    wherein the outer protrusion is configured to be inserted into a gap between the inner circumferential surface of the nut and the outer circumferential surface of the clamping ring, such that the outer circumferential surface of the outer protrusion and the second seat portion of the nut come into a surface contact to each other,
    wherein a distal end of the corrugated pipe is configured to be pressed between the front surface of the socket and the clamping ring,
    wherein the front surface of the socket is formed with an inner protrusion so that the inner protrusion is spaced radially inwards apart from the outer protrusion,
    wherein a groove is formed between the inner protrusion and the outer protrusion, and
    wherein the inner protrusion is formed so as to face a one side surface of the clamping ring for pressing the distal end of the corrugated pipe towards the clamping ring.

2. The device according to claim 1, wherein two side surfaces of the inner portion of the clamping ring come into a surface contact with an outer surface of the corrugated pipe and the two side surfaces of clamping ring extend in a perpendicular direction from the two side surfaces of the inner portion outward the corrugated pipe.

3. The device according to claim 2, wherein the inner circumferential surface of the nut is formed with a slope between a region thereof to be screwed to the socket and the first seat portion so that the clamping ring is pressed radially inwards by the slope.

4. The device according to claim 3, wherein the slope is composed of first and second slopes spaced apart from each other in a longitudinal direction of the nut.

5. The device according to claim 4, wherein the second seat portion on which the outer protrusion is seated is formed between the first and second slopes.

6. The device according to claim 2, wherein the first seat portion is formed with a stepped portion that protrudes radially inwards to press the clamping ring towards the socket.

7. The device according to claim 6, wherein the stepped portion longitudinally extends so as to come into contact at an inner circumferential surface thereof with at least two ridges of the corrugated pipe.

8. The device according to claim 1, wherein the inner protrusion comprises an angled upper edge, and the edge presses the distal end of the corrugated pipe in linear contact with the distal end of the corrugated pipe.

9. The device according to claim 8, wherein the inner protrusion protrudes radially inwards from an inner circumferential surface of the socket so as to be rounded at an obtuse angle, so that a thick reinforcement portion is formed at a connection region between the inner protrusion and the inner circumferential surface of the socket.

10. The device according to claim 1, wherein the socket comprises a fastening portion configured to be screwed to the nut and an exposed portion extending from the fastening portion in a direction opposite the clamping ring, and
    wherein an inner circumferential surface of the exposed portion is recessed radially further outwards than an inner circumferential surface of the fastening portion.

11. The device according to claim 10, wherein the exposed portion has a smallest thickness equal to or less than a thickness of the fastening portion.

12. The device according to claim 10, wherein the socket further comprises a connection portion extending from one side of the exposed portion in a direction opposite the fastening portion so as to be connected to a predetermined joint.

13. The device according to claim 12, wherein the inner circumferential surface of the exposed portion is recessed radially further outwards than an inner circumferential surface of the connection portion so that a ring-shaped space is defined between the fastening portion and the connection portion.

* * * * *